ROY R. IRELAND, OF CHICAGO, ILLINOIS, AND ALBERT F. F. GILSON, OF CLOSTER, NEW JERSEY, ASSIGNORS TO WESTERN ELECTRIC COMPANY, OF NEW YORK, N. Y., A CORPORATION OF ILLINOIS.

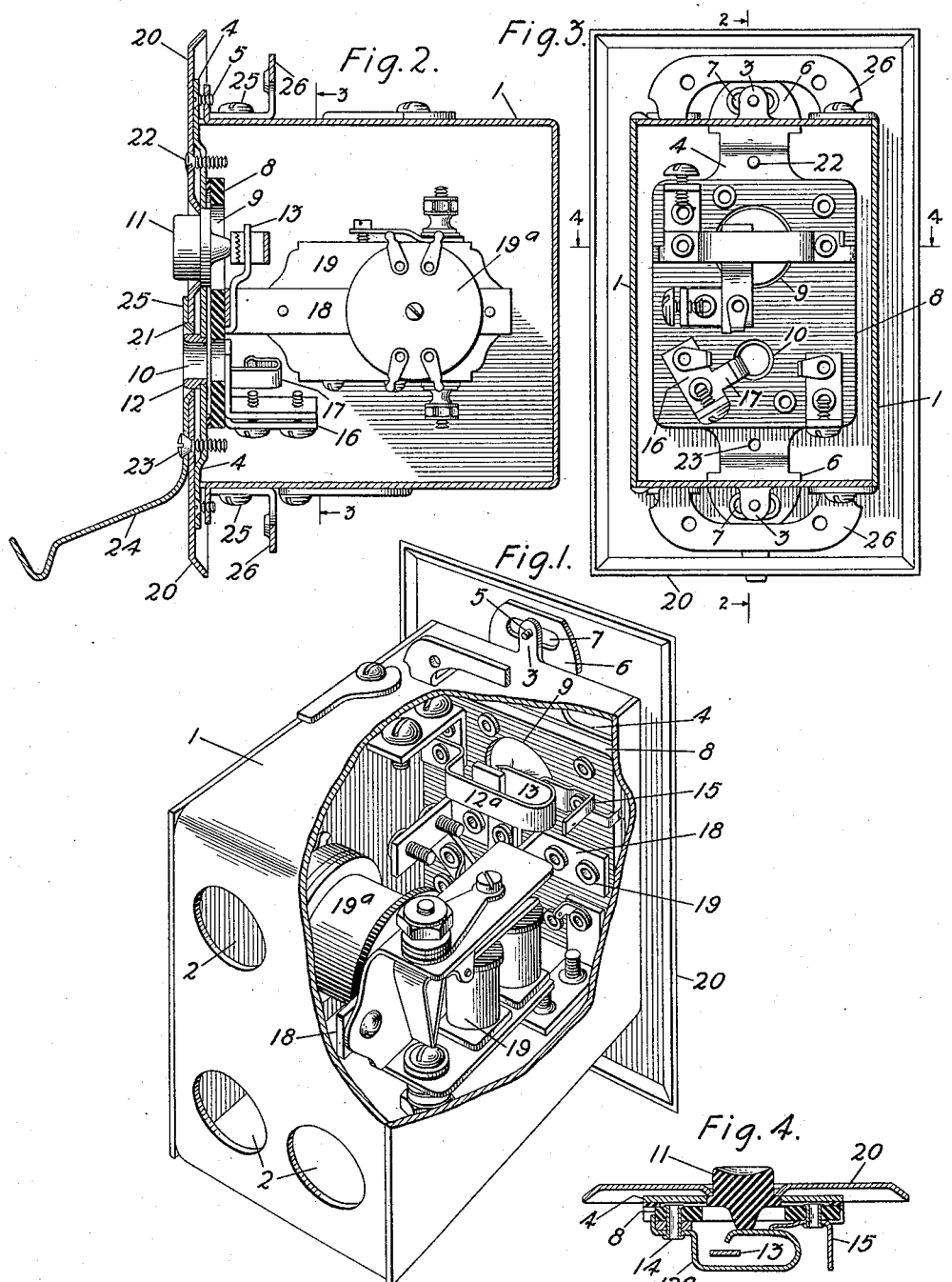

HOUSE TELEPHONE SET.

1,161,863.

Specification of Letters Patent.

Patented Nov. 30, 1915.

Application filed September 18, 1913. Serial No. 790,420.

*To all whom it may concern:*

Be it known that we, ROY R. IRELAND, and ALBERT F. F. GILSON, citizens of the United States, residing at Chicago, in the county of Cook and State of Illinois, and at Closter, in the county of Bergen and State of New Jersey, respectively, have invented a certain new and useful Improvement in House Telephone Sets, of which the following is a full, clear, concise, and exact description.

This invention relates to telephone substation apparatus and more particularly to apparatus of this character which is adapted to be used in connection with house or intercommunicating systems.

It is an object of this invention to provide a compact, inexpensive substation set which may be installed in an ordinary outlet or junction box such as is commonly used in house wiring systems for the reception of lighting switches. With this object in view, a signaling device such as a bell or buzzer, a push button switch for signaling other substations and a spring jack for connecting a hand telephone set to the telephone line, are mounted upon a supporting plate which is adapted to be secured to the junction box. A brass cover or wall plate, which is similar to the wall plates used in connnection with lighting systems, acts as a cover for the outlet box and in conjunction with the outlet box entirely incloses the substation apparatus. A suitable aperture is provided in the wall plate through which the push button may project, and another aperture through which connection may be made to the spring jack.

The invention will be more fully understood by referring to the accompanying drawing wherein—

Figure 1 is a rear perspective view of the apparatus with a portion of the outlet box broken away to show the mounting of the signaling device and other substation apparatus. Fig. 2 is a longitudinal section upon the line 2—2 of Fig. 3. Fig. 3 is a cross section on the line 3—3 of Fig. 2 looking in the direction of the arrows, and Fig. 4 is a section through the push button taken on the line 4—4 of Fig. 3.

In the drawing, 1 indicates the outlet or junction box which may be and preferably is in all respects similar to the usual box of this type which is used in house wiring systems for the reception of switches, etc. This box is adapted to be installed in a recess in the wall of a room with its outer end flush with the surface of the wall, and is provided with the usual apertures 2 for connecting with the conduit, commonly used in house wiring. The outlet box 1 is provided with two ears 3 to which the supporting plate 4 may be attached by means of screws 5. The supporting plate 4, as shown in Figs. 1 and 3, is provided with two lugs 6 in which are located a pair of slots 7, the object of such slots being to allow adjustment of the supporting plate relative to the outlet box.

Secured to the back of the supporting plate 4 is a plate 8, which may be of any well known insulating material, such as fiber board. The supporting plate 4 and the insulating plate 8 are provided with two apertures 9 and 10, the aperture 9 serving as a guideway for the push button 11 and the aperture 10 being adapted to receive a metallic sleeve 12 which forms part of a spring jack. Also mounted on the plate of insulating material 8 is a contact spring 12$^a$ which, in connection with the push button 11 and the contact piece 13, forms an ordinary push button switch. As shown in Fig. 4, the contact spring 12$^a$ is attached to the insulating plate 8 by means of an eyelet 14, and as shown in the various figures, similar eyelets are employed to secure the various binding posts and brackets to the insulating plate 8.

Adjacent the contact spring 12 and contacting therewith when the push button 11 is in its normal position, is an auxiliary contact spring 15, this contact spring being used to connect the signaling device across a line when the push button is not depressed.

Mounted on the insulating plate 8, adjacent to aperture 10, is a bracket 16.

Integral with the bracket 16, or suitably riveted thereto, is a spring tongue 17, which forms with the sleeve 12, an ordinary spring jack adapted to coöperate with a plug, which plug is connected to a portable hand telephone set. If it is desired to permanently connect the telephone to the substation apparatus, the tongue may be omitted from the bracket 16 and the conductors leading to the telephone set may be passed into the aperture 10 and connected to suitable binding posts carried by the insulating plate 8.

Mounted substantially centrally on the insulating plate 8 and extending at right angles thereto is a bracket piece 18. This bracket is provided with an angularly disposed end 19 through which a plurality of eyelets are passed to secure the bracket to the insulating plate. This bracket 18 serves to support a signaling device 19, which may be a bell, buzzer or similar electrical actuated signaling device, and also the retardation coil 19$^a$. The retardation coil 19$^a$ may be omitted and in practice is installed only in one substation set as only one coil is necessary for an entire system. The buzzer and retardation coil are provided with suitable terminals and binding posts which will not be described in detail.

Adapted to fit over the supporting plate 4 and to close the open end of the junction or outlet box, is a wall or cover plate 20. This wall plate is provided with two apertures, one of which registers with the push button aperture 9 of the supporting plate 4, and the other registers with the jack sleeve aperture 10.

As is shown in Fig. 2, the wall plate adjacent the jack sleeve 12 is provided with an annular depression 21. The screws 22 and 23 serve to secure the wall plate to the supporting plate 4 and hence to the outlet or junction box 1. The screw 23, in addition to securing the wall plate to the supporting plate, also provides one point of attachment for hook 24. The hook 24 is provided with an upper annular end 25, which has a depressed portion entering the annular depression 21 in the wall plate 20, preventing the hook from turning about the screw 23. The hook 24 provides a means of support for the ordinary portable telephone set.

Secured to the outlet box 1 by screws 25, is a plurality of supporting lugs 26, by means of which the outlet box may be secured within a recess in the wall.

The substation apparatus herein described is very compact and inexpensive and is so arranged that it may be entirely inclosed within an ordinary junction or outlet box which may be installed at the time that the house wiring system is installed. Because of the fact that all of the apparatus is contained in the outlet box and is covered by a wall plate which conforms to the other electrical fixtures in the room in which it is installed, the set is very neat in appearance, does not protrude from the surface of the wall and does not detract from the appearance of the room.

We claim.

1. In a telephone substation set, in combination a plate adapted to be secured in an outlet box, a signaling device, push button switch and spring jack mounted on the rear side of said plate with the push button and jack projecting through said plate, a cover plate for said outlet provided with openings registering with the push button and jack, and a hook mounted on said cover plate.

2. In a telephone substation set, in combination an outlet box, a cover plate adapted to cover said outlet box, a carrying plate secured to said outlet box beneath and adjacent to said cover plate, a signaling device, push button switch and spring jack mounted on said carrying plate, and extending within said outlet box, said cover plate being provided with openings through which the said push button and spring jack are accessible, whereby a telephone hand set may be connected to said jack and another station signaled by means of said push button.

3. In a telephone substation set adapted to be inclosed in an outlet box, a wall plate adapted to act as a cover for said outlet box, a carrying plate secured in said outlet box beneath and adjacent to said wall plate, a push button switch, a signaling device and a spring jack mounted on said carrying plate, said wall plate being provided with apertures registering with said push button and jack, and a hook secured to said wall plate.

4. A telephone substation apparatus comprising an outlet box, a cover plate therefor, a supporting plate therein, a spring jack comprising a jack sleeve and spring, the said cover plate being provided with an aperture through which the jack sleeve projects, and a supporting hook having an annular upper end embracing said jack sleeve and partially supported thereby.

5. In a telephone set, an open ended receptacle adapted to be mounted within a recess in a wall with its open end flush with the surface of said wall, a cover plate for said open end, a signaling device, a push button switch, and a spring jack carried by said cover plate and extending within said receptacle.

6. In a telephone substation set, an open ended receptacle, means for securing said receptacle in a recess in a wall with the open end flush with the surface of the wall, a plate, an insulating plate supported thereby, substation apparatus mounted on said insulating plate, and means for securing said first mentioned plate across the open end of said receptacle with said substation apparatus extending within said receptacle.

In witness whereof, I hereunto subscribe my name this 5th day of September, A. D., 1913.

ROY R. IRELAND.

Witnesses:
W. ADAMS,
W. S. HAINES.

In witness whereof, I hereunto subscribe my name this 8th day of September, A. D., 1913.

ALBERT F. F. GILSON.

Witnesses:
HOWARD DARLING,
MURRAY V. CONATY.

Copies of this patent may be obtained for five cents each, by addressing the "Commissioner of Patents. Washington, D. C."